United States Patent [19]
Sato et al.

[11] Patent Number: 5,416,902
[45] Date of Patent: May 16, 1995

[54] COMPUTER-BASED SYSTEM AND METHOD FOR EDITING FIGURES

[75] Inventors: Hiroto Sato, Tokyo; Sakura Shinoaki, Fujisawa; Kyozo Tanaka, Tokyo, all of Japan

[73] Assignee: Tokyo Gas Co., Ltd., Tokyo, Japan

[21] Appl. No.: 117,055

[22] PCT Filed: Jan. 8, 1993

[86] PCT No.: PCT/JP93/00015

§ 371 Date: Sep. 9, 1993

§ 102(e) Date: Sep. 9, 1993

[87] PCT Pub. No.: WO93/14466

PCT Pub. Date: Jul. 22, 1993

[30] Foreign Application Priority Data

Jan. 10, 1992 [JP] Japan ................... 4-022106

[51] Int. Cl.6 .............. G06T 11/20; G09G 1/06
[52] U.S. Cl. ................... 395/161; 395/143; 395/155; 382/276
[58] Field of Search ........... 395/161, 155, 140, 143; 382/41

[56] References Cited

U.S. PATENT DOCUMENTS 4,665,555 5/1987 Alker et al. .................. 382/41 X
5,179,651 1/1993 Taaffe et al. ................ 395/161 X

FOREIGN PATENT DOCUMENTS 63-45629  2/1988 Japan .
63-186374 8/1988 Japan .
2-252068 10/1990 Japan .

Primary Examiner—Heather R. Herndon
Assistant Examiner—Cliff Nguyen Vo
Attorney, Agent, or Firm—Sterne, Kessler, Goldstein & Fox

[57] ABSTRACT

A graphic editing system and method uses a terminal for editing line graphic data stored in a host computer. The graphic data of a drawing to be edited is retrieved from a common file and is loaded onto the host computer's work area. The graphic data is then loaded onto the terminal's memory and displayed on the terminal. A line of the drawing to be edited is selected on the terminal. The line to be edited is then searched in the host computer's work area and stored in the host computer's edit area, where it is edited. The edited line is then loaded into the terminal's memory from the edit area and displayed on the terminal.

10 Claims, 20 Drawing Sheets

| DATA OF LINE TO BE EDITED ||
|---|---|
| COORDINATE DATA | ATTRIBUTE DATA |
| $x_1$  $y_1$ | 2 |
| $x_2$  $y_2$ | 2 |
| $x_3$  $y_3$ | 2 |
| $x_4$  $y_4$ | 2 |
| $x_5$  $y_5$ | 2 |
| $x_6$  $y_6$ | 2 |
| $x_7$  $y_7$ | 2 |
| $x_8$  $y_8$ | 2 |
| $x_9$  $y_9$ | 2 |
| $x_{10}$  $y_{10}$ | 2 |
| $x_{11}$  $y_{11}$ | 2 |
| $x_{12}$  $y_{12}$ | 5 |

"2": CODE SPECIFYING DISPLAY OF LINE TO BE EDITED

"5": FINAL CHARACTERISTIC POINT CODE

← CHARACTERISTIC POINT DATA OF $P_1$ (INFLECTION POINT DATA)

← CHARACTERISTIC POINT DATA OF $P_{12}$

FIG. 12

| DATA OF LINE TO BE EDITED ||
|---|---|
| COORDINATE DATA | ATTRIBUTE DATA |
| $x_1$   $y_1$ | 2 |
| $x_2$   $y_2$ | 2 |
| $x_3$   $y_3$ | 2 |
| $x_4$   $y_4$ | 2 |
| $x_{13}$   $y_{13}$ | 3 |
| $x_5$   $y_5$ | 3 |
| $x_6$   $y_6$ | 3 |
| $x_{17}$   $y_{17}$ | 2 |
| $x_7$   $y_7$ | 2 |
| $x_8$   $y_8$ | 2 |
| $x_9$   $y_9$ | 2 |
| $x_{10}$   $y_{10}$ | 2 |
| $x_{11}$   $y_{11}$ | 2 |
| $x_{12}$   $y_{12}$ | 4 |
| $x_{13}$   $y_{13}$ | 5 |

"2": CODE SPECIFYING DISPLAY OF LINE TO BE EDITED
"3": BACKGROUND COLOR DISPLAY CODE
"4": JUMP CODE
"5": FINAL CHARACTERISTIC POINT CODE

CORRESPONDING TO DELETION OF SEGMENTS ($P_{13}$-$P_5$-$P_6$-$P_{17}$)

ATTRIBUTE DATA IS CHANGED FROM "5"

PRIMARY ADDITIONAL POINT $P_{13}$

FIG. 14

| DATA OF LINE TO BE EDITED | |
|---|---|
| COORDINATE DATA | ATTRIBUTE DATA |
| $x_1$ $y_1$ | 2 |
| $x_2$ $y_2$ | 2 |
| $x_3$ $y_3$ | 2 |
| $x_4$ $y_4$ | 2 |
| $x_{13}$ $y_{13}$ | 3 |
| $x_5$ $y_5$ | 3 |
| $x_6$ $y_6$ | 3 |
| $x_{17}$ $y_{17}$ | 2 |
| $x_7$ $y_7$ | 2 |
| $x_8$ $y_8$ | 2 |
| $x_9$ $y_9$ | 2 |
| $x_{10}$ $y_{10}$ | 2 |
| $x_{11}$ $y_{11}$ | 2 |
| $x_{12}$ $y_{12}$ | 4 |
| $x_{13}$ $y_{13}$ | 2 |
| $x_{14}$ $y_{14}$ | 5 |

"2": CODE SPECIFYING DISPLAY OF LINE TO BE EDITED
"3": BACKGROUND COLOR DISPLAY CODE
"4": JUMP CODE
"5": FINAL CHARACTERISTIC POINT CODE

CORRESPONDING TO DELETION OF SEGMENTS ($P_{13}$-$P_5$-$P_6$-$P_{17}$)

46

| DATA FOR ADDITIONAL DISPLAY | |
|---|---|
| COORDINATE DATA | ATTRIBUTE DATA |
| $x_{13}$ $y_{13}$ | 2 |
| $x_{14}$ $y_{14}$ | 5 |

SECONDARY ADDITIONAL POINT $P_{14}$
PRIMARY ADDITIONAL POINT $P_{13}$

FIG. 15

| DATA OF LINE TO BE EDITED ||
|---|---|
| COORDINATE DATA | ATTRIBUTE DATA |
| $x_1$  $y_1$ | 2 |
| $x_2$  $y_2$ | 2 |
| $x_3$  $y_3$ | 2 |
| $x_4$  $y_4$ | 2 |
| $x_{13}$  $y_{13}$ | 3 |
| $x_5$  $y_5$ | 3 |
| $x_6$  $y_6$ | 3 |
| $x_{17}$  $y_{17}$ | 2 |
| $x_7$  $y_7$ | 2 |
| $x_8$  $y_8$ | 2 |
| $x_9$  $y_9$ | 2 |
| $x_{10}$  $y_{10}$ | 2 |
| $x_{11}$  $y_{11}$ | 2 |
| $x_{12}$  $y_{12}$ | 4 |
| $x_{13}$  $y_{13}$ | 2 |
| $x_{14}$  $y_{14}$ | 2 |
| $x_{15}$  $y_{15}$ | 2 |
| $x_{16}$  $y_{16}$ | 2 |
| $x_{17}$  $y_{17}$ | 5 |

"2": CODE SPECIFYING DISPLAY OF LINE TO BE EDITED
"3": BACKGROUND COLOR DISPLAY CODE
"4": JUMP CODE
"5": FINAL CHARACTERISTIC POINT CODE

CORRESPONDING TO DELETION OF SEGMENTS ($P_{13}$-$P_5$-$P_6$-$P_{17}$)

CORRESPONDING TO ADDITION OF SEGMENTS ($P_{13}$-$P_{14}$-$P_{15}$-$P_{16}$-$P_{17}$)

FIG. 16

| DATA OF LINE TO BE EDITED ||  |
|---|---|---|
| COORDINATE DATA || ATTRIBUTE DATA |
| $x_1$ | $y_1$ | 2 |
| $x_2$ | $y_2$ | 2 |
| $x_3$ | $y_3$ | 2 |
| $x_4$ | $y_4$ | 2 |
| $x_5$ | $y_5$ | 2 |
| $x_6$ | $y_6$ | 2 |
| $x_7$ | $y_7$ | 2 |
| $x_8$ | $y_8$ | 2 |
| $x_9$ | $y_9$ | 2 |
| $x_{10}$ | $y_{10}$ | 2 |
| $x_{11}$ | $y_{11}$ | 2 |
| $x_{12}$ | $y_{12}$ | 2 |
| $x_{18}$ | $y_{18}$ | 2 |
| $x_{19}$ | $y_{19}$ | 5 |

"2": CODE SPECIFYING DISPLAY OF LINE TO BE EDITED

"5": FINAL CHARACTERISTIC POINT CODE

CORRESPONDING TO ADDITION OF SEGMENTS ($P_{12}$-$P_{18}$-$P_{19}$)

FIG. 17

COMPUTER-BASED SYSTEM AND METHOD FOR EDITING FIGURES

TECHNICAL FIELD

The present invention relates to a graphic editing method and system for editing line figures of a predetermined format, which undergo central management by a host computer (hereinafter referred to as "host").

BACKGROUND ART

Heretofore, it has been performed to display drawings on a monitor display on the basis of graphic data prepared in advance by a computer and stored in a storage unit, and to correct (delete, add, and the like) the displayed graphics. (This is referred to as computer mapping hereinafter). Such drawings include ones showing the condition of underground facilities such as gas pipes, water pipes, and the like, and ones showing configurations of roads and conditions of road facilities.

FIG. 18 shows an arrangement of a conventional computer mapping system.

This system comprises a host 21 and a terminal 29, which are interconnected by a communication line 37.

The terminal 29 comprises a communication interface 30, a control processor 31, a picture memory 32, a frame buffer 33, a CRT (display portion) 34, a digitizer (input portion) 35, and an image bus 36.

The host 21 comprises a memory 22, a communication interface 25, a host processor 26, a common file storage unit 27, and a host bus 28.

The memory 22 has an application program storing area 24 for storing application programs, and a work area 23.

Graphic data stored in the common file storage unit 27 has a format, for example, as shown in FIG. 19. It comprises a header 51, and graphic data 52 following the header 51. The graphic data 52 comprises coordinate data 53 indicating positions of characteristic points (or inflection points) of lines, and attribute data 54 indicating line types, colors, and the like between a characteristic point and the next characteristic point. Hereinafter, a set of the coordinate data and the attribute data is referred to as characteristic point data (or inflection point data).

FIG. 20 is a flowchart showing an application program stored in the application program storing area 24.

Suppose that a drawing (paper) to be edited is set on the digitizer 35. In this condition, when a display request command is issued in step S201 by operator's handling of the digitizer 35, and a drawing number specifying the drawing to be edited is entered, the display request command and the drawing number are transferred to the communication interface 30 through the image bus 36 by the control processor 31, and then transmitted to the host 21 through the communication line 37 by the communication interface 30 in step S202.

When the display request command and the drawing number are received by the communication interface 25 of the host 21 in step S203, the graphic data set of the drawing to be edited associated with the drawing number is retrieved from the common file storage unit 27 by the host processor 26. The retrieved graphic data set is stored in the work area 23 of the memory 22. Then, the graphic data set in the work area 23 is transferred to the communication interface 25 through the host bus 28, and transmitted to the terminal 29 through the communication line 37 by the communication interface 25.

When the graphic data is received by the communication interface 30 of the terminal 29 in step S204, the received graphic data is stored in the picture memory 32 by the control processor 31. Then, the graphic data in the picture memory 32 is stored in the frame buffer 33 by the control processor 31, and the figure is raster displayed on the CRT 34 on the basis of the graphic data stored in the frame buffer 33.

When edit data indicating correction types such as deletion and addition, and correction starting points are entered by the operator's handling of the digitizer 35 in step S205, the edit data is transferred to the communication interface 30 by the control processor 31, and transmitted to the host 21 through the communication line 37 by the communication interface 30.

When the edit data is received by the communication interface 25 of the host 21 in step S206, the host processor 26 corrects the graphic data stored in the work area 23 on the basis of the edit data. After correction, the graphic data set is transmitted to the terminal 29 through the communication line 37 by the communication interface 25 as correction display data.

When the correction data is received by the communication interface 30 of the terminal 29 in step S207, the received correction data is stored in the picture memory 32 by the control processor 31, and subsequently, the graphic data in the picture memory 32 is loaded on the frame buffer 33. Then, the drawing is displayed on the CRT 34 on the basis of the graphic data in the frame buffer 33. Then, determination is made in step S208 as to whether or not the operator manipulates the terminal 29 to transmit an end command to the host 21. If the result is negative, the processing returns to step S205, whereas if it is positive, the processing moves to step S209, where all the graphic data in the work area 23 are transferred and stored in the common file storage unit 27.

However, every time the drawing is corrected, all the graphic data in the work area 23 are sequentially transferred from the host 21 to the terminal 29 so that the corrected drawing is displayed on the CRT 34 on the basis of all the graphic data received. As a result, time period from the correction of the graphic data to the display of the corrected drawing cannot be reduced beyond a certain limit. Hence, the operator must wait patiently until the corrected drawing is displayed after correcting the graphic data. This will hinder the edit work from being smoothly carried out.

To avoid such a waiting time, it may be possible to correct data without displaying, but this will lead to misoperations by the operator.

Furthermore, another problem arises from correcting the graphic data in the work area 23 in the data correction. For example, when an error is found in the preceding correction, and hence an attempt is made to restore the graphic data before correction, it is necessary to load the uncorrected graphic data again from the common file storage unit 27 onto the work area 23. This is because only the corrected data is present in the work area 23, and not the uncorrected graphic data. Thus, the restoration takes a rather long time.

To solve such problems, the following correction method is conceived. First, the same application program as that of the host 21 is stored in the terminal 29. Second, the graphic data in the work area of the host 21 is loaded on an edit area provided in the terminal 29 in accordance with the application program before correction. Then, the graphic data loaded on the edit area is corrected. However, this presents a problem in that the cost of the entire system will increase with the number of the terminals 29 because of the cost of the hardware and software, which presents another problem that the system is not practical.

SUMMARY OF DISCLOSURE OF THE INVENTION

Therefore, it is an object of the present invention to solve the above-described problems, and to provide a graphic editing method and system which can shorten the time period from correcting graphic data to displaying a corrected graphic pattern, and can display a graphic pattern before correction in a short time.

Another object of the present invention is to provide a computer program product for carrying out such a graphic editing method.

To accomplish the objects, the present invention provides:

1) A graphic editing method for editing line graphic data of a predetermined format stored in storage means of a host computer, by using a terminal capable of communicating with the host computer, the method comprising:

a first step for retrieving, in response to a request for displaying a drawing to be edited made from the terminal to the host computer, graphic data of the drawing to be edited from the storage means of the host computer, and for loading the graphic data on a work area in the host computer;

a second step for loading the graphic data of the drawing to be edited in the work area to storage means of the terminal;

a third step for displaying the drawing to be edited on display means of the terminal on the basis of the graphic data of the drawing to be edited loaded on the storage means of the terminal;

a fourth step for searching, in response to a request for identifying a line to be edited in the drawing to be edited made from the terminal to the host computer, the work area for the line to be edited, and for developing a result of the search in an edit area in the host computer;

a fifth step for editing the line to be edited in the edit area in the host computer in response to an edit request made from the terminal to the host computer;

a sixth step for loading data of the line to be edited, which has been edited in the edit area in the host computer, on the storage means of the terminal; and a seventh step for displaying a drawing on the display means of the terminal on the basis of data stored in the storage means of the terminal.

2) In the graphic editing method of 1), the fourth step changes attribute data developed in the edit area to a code specifying the line to be edited in order to visually distinguish the line, the sixth step transmits to the terminal graphic data whose attribute data is changed to the code specifying the line to be edited, and the seventh step displays the drawing on the display means on the basis of the changed graphic data received.

3) In the graphic editing method of 1) or 2), the fifth step, when the correction start point on the line to be edited corresponds to coordinate data of a point on the graphic data developed in the edit area, uses that coordinate data, or when the correction start point does not correspond to any of the coordinate data, adds a point, which corresponds to the correction start point on the line between characteristic points in the immediate vicinity of said correction start point, to the graphic data as a new characteristic point.

4) In the graphic editing method of 3), the fifth step, when content of edit data is "deletion of a line segment between correction start points on a line to be edited" changes attribute data between characteristic points corresponding to the correction start points of the graphic data developed in the edit area to a background color code of the display means, and subsequently transmits to the terminal the graphic data at least between the characteristic points as correction display data, and the seventh step displays the line to be edited between the characteristic points in the same color as the background color on the basis of the received correction data.

5) In the graphic editing method of 3), the fifth step, when content of edit data is "a start point between correction start points" and the correction start point does not correspond to a point on the line to be edited, takes the correction start point into the graphic data developed in the edit area as a new characteristic point.

6) In the graphic editing method of 3) or 5), the fifth step, when content of edit data is "addition between correction start points" after sequentially arranging coordinate data of individual characteristic points corresponding to the correction start points, and changing attribute data of a primary additional characteristic point into a code specifying display of the line to be edited, transmits content of the graphic data developed in the edit area to the terminal as correction display data that visually distinguishes at least the graphic data between the characteristic points, and the seventh step displays on the display means a line segment between the characteristic points as a line to be edited on the basis of the received correction data.

7) A graphic editing system including a host computer having storage means for storing line graphic data of a predetermined format, and a terminal capable of communicating with the host computer, the host computer comprising:

data retrieving means for retrieving, in response to a request for displaying a drawing to be edited made from the terminal to the host computer, graphic data of the drawing to be edited from the storage means;

first load means for loading on a work area the graphic data of the drawing to be edited, which has been retrieved by the data retrieving means;

search means for searching, in response to a request for identifying a line to be edited in the drawing to be edited made from the terminal to the host computer, the work area for the line to be edited;

an edit area for developing a result of the search by the search means; and edit means for editing the line to be edited in the edit area in response to an edit request made from the terminal to the host computer; and the terminal comprising:

second load means for loading the graphic data of the drawing to be edited, which has been retrieved by the data retrieving means, on storage means of the terminal, and for loading line data to be edited, which has been edited in the edit area, on the storage means of the terminal; and display means for displaying a drawing to be edited on the basis of the graphic data of the drawing to be edited, which is loaded by the second load means, and for displaying a drawing after edition on the basis of the graphic data after edition which are stored in the storage means of the terminal.

8) A computer program product for use with a graphic editing system comprising a host computer having storage means for storing line graphic data of a predetermined format, and a terminal capable of communicating with the host computer, the computer program product comprising:

first program code means readable by the host computer for retrieving, in response to a request to display a drawing to be edited made by the terminal, graphic data of the drawing to be edited from the storage means in the host computer, and for transmitting the graphic data to the terminal;

second program code means readable by the host computer for loading the graphic data of the drawing to be edited retrieved from the storage means on a work area in the host computer;

third program code means readable by the host computer for searching, in response to a request for identifying a line to be edited in the drawing to be edited made from the terminal to the host computer, the work area for the line to be edited, and for developing a result of the search in an edit area in the host computer;

fourth program code means readable by the host computer for editing the line to be edited in the edit area in response to an edit request made from the terminal to the host computer, and for transmitting a result of the edition to the terminal; and a storage medium which can be loaded on the host computer to store the first to fourth program code means.

BRIEF DESCRIPTION OF THE DRAWINGS

FIG. 12 a schematic diagram showing the contents of graphic data developed in an edit area from a work area;

FIG. 14 is a schematic diagram showing the contents of the graphic data when an end point $P_{13}$ is processed as an additional primary point in step S92 shown in FIG. 9;

FIG. 15 is a schematic diagram showing the contents of the graphic data after correcting processing on a first additional point $P_{14}$ has been completed in step S95 shown in FIG. 9;

FIG. 16 is a schematic diagram showing the graphic data after the completion of the additional processing;

FIG. 17 is a schematic diagram showing the graphic data when the additional processing of the line segments "$P_{12}$-$P_{18}$-$P_{19}$" to the line to be edited shown in FIG. 11 has been completed;

BEST MODE FOR CARRYING OUT THE INVENTION

An embodiment of the present invention will now be described in detail with reference to the drawings.

The principle of the present invention will be described with reference to FIGS. 1 and 2.

Figure 1:
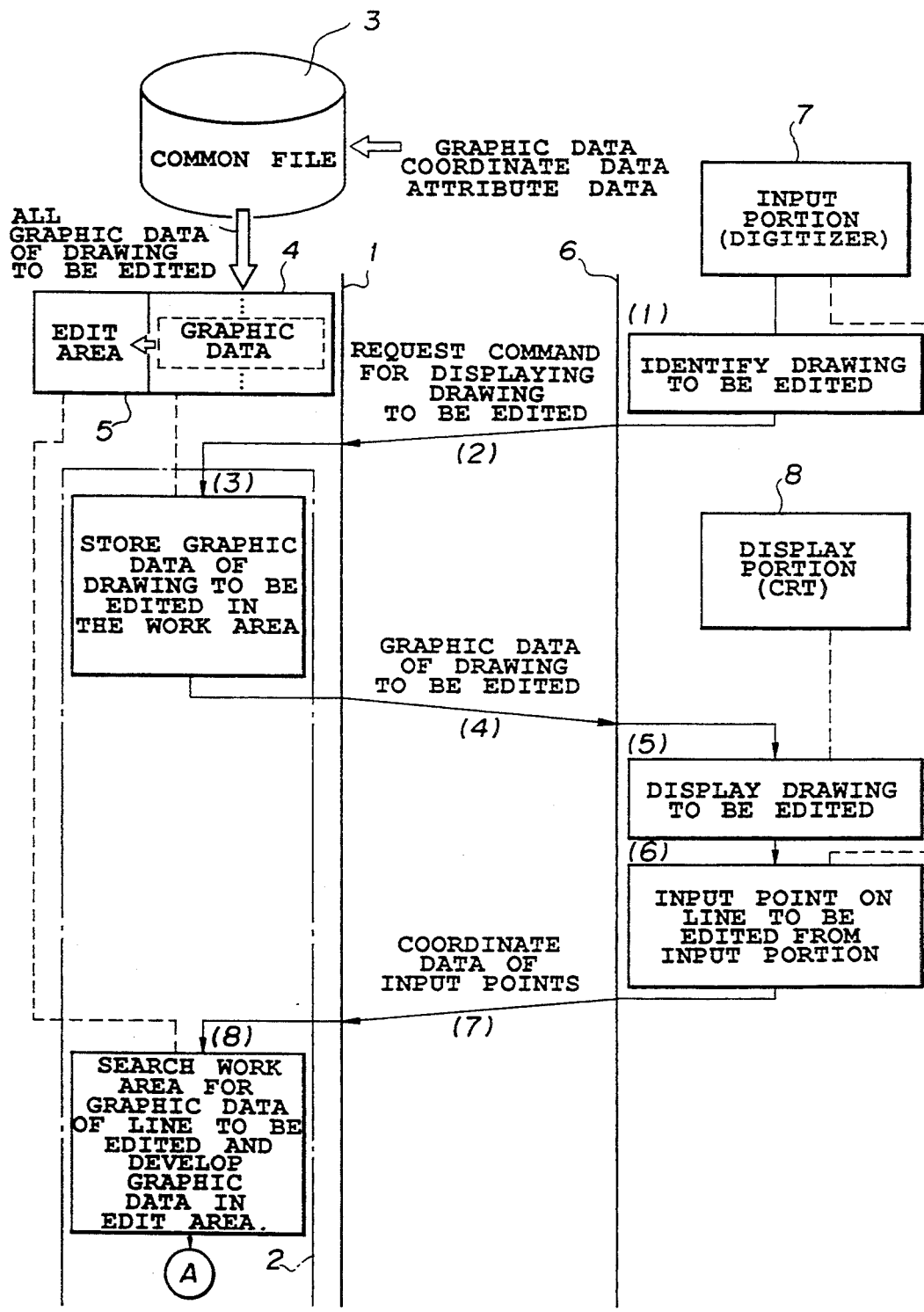
FIG. 1 is a schematic block diagram (1) for explaining the principle of the present invention.
Figure 2:
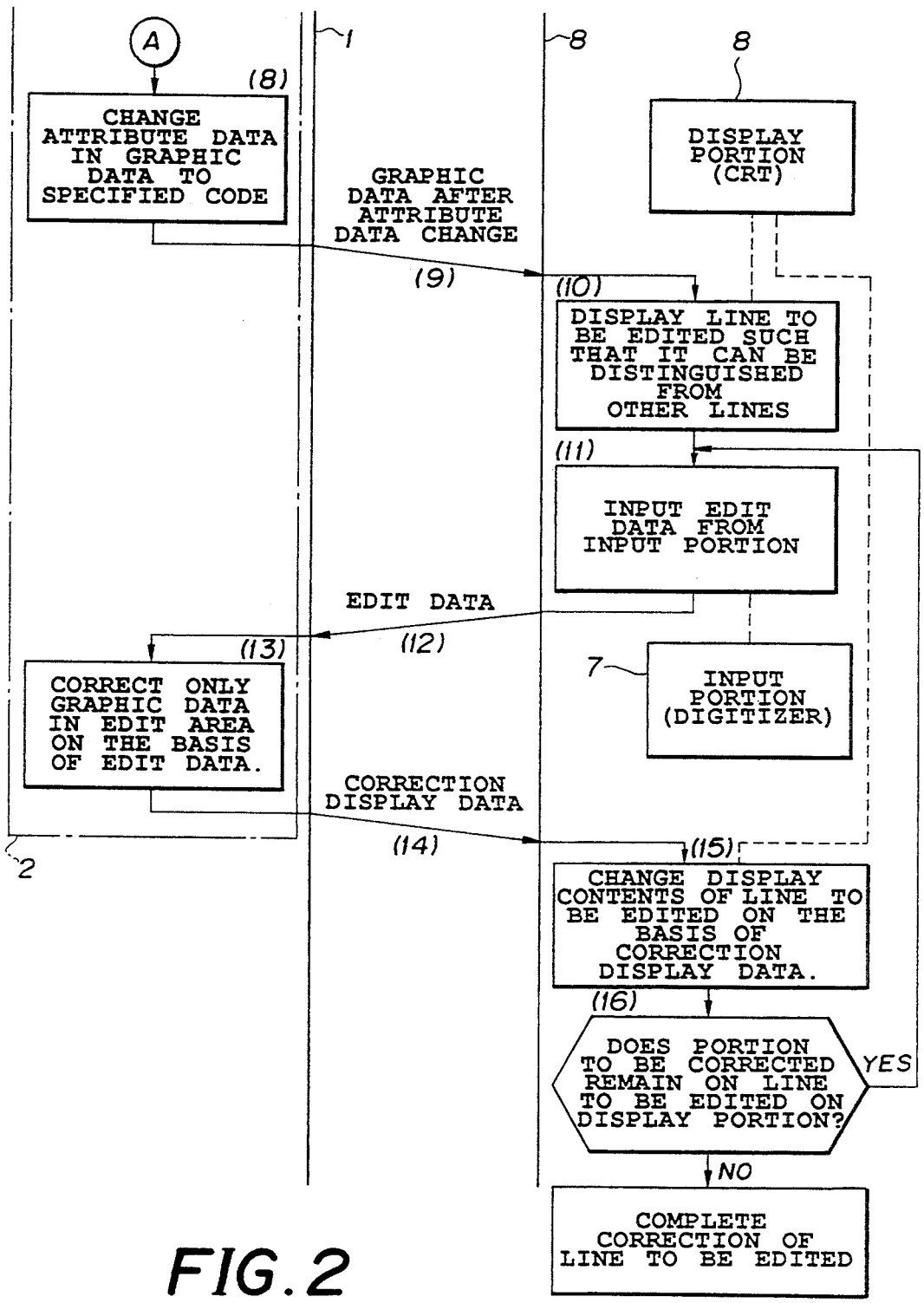
FIG. 2 is a schematic block diagram (2) for explaining the principle of the present invention.

In FIGS. 1 and 2, the reference numeral 1 designates a host. In the host 1, an application program 2 is stored in a predetermined storage unit, and a common file 3 is stored in another predetermined storage unit. In addition, the host computer 1 comprises a work area 4 for storing a drawing to be edited which is retrieved from the common file 3, and an edit area 5 for developing a line to be edited which is retrieved from the work area 4.

The application program 2 is provided for carrying out processings such as retrieving a drawing to be edited from the common file 3, storing the retrieved drawing to be edited in the work area 4, searching the drawing to be edited in the work area 4 for a line to be edited, developing the searched line to be edited in the edit area 5, and correcting the line to be edited in the edit area 5 on the basis of edit data supplied from a terminal 6.

The common file 3 comprises a plurality of graphic data of a predetermined format. Each graphic data comprises coordinate data indicating positions of individual characteristic points on a line constituting a line pattern, and attribute data indicating a line type and color between the characteristic points. The attribute data may include codes for defining curves such as a semicircle connecting characteristic points. The common file 3 undergoes batch control.

The reference numeral 6 denotes a terminal comprising an input portion 7 and a display portion 8. The system as a whole comprises a plurality of terminals 6 connected to the host 1.

The input portion 7 is, for example, a digitizer, and is provided for indicating a drawing or line to be edited, and for inputting data to be edited.

The display portion 8 is, for example, a CRT, which displays a graphic pattern according to the graphic data in the work area 4 or the edit area 5.

Next, a graphic editing procedure will be described with reference to FIGS. 1 and 2.

(1) The input portion 7 is manipulated by an operator, and the drawing number, for example, of a drawing to be edited is entered.

(2) Then, the terminal 6 transmits a display request command for the drawing to be edited to the host 1.

(3) Receiving the display request command, the host 1 retrieves all the graphic data of the drawing to be edited using the application program 2, and stores the retrieved drawing to be edited in the work area 4.

(4) In addition, the host 1 transmits the graphic data of the drawing to be edited in the work area 4 to the terminal 6 demanding the display of the graphic data.

(5) When the graphic data of the drawing to be edited is received by the terminal 6, the graphic data is stored in a predetermined storage unit of the terminal 6, and the drawing to be edited is displayed on the display portion 8 on the basis of the graphic data. Thus, the operator can confirm the line to be edited on the screen of the display.

(6) Then, coordinates, for example, of any point on the line to be edited in the drawing to be edited which is set on the digitizer is inputted from the digitizer used as the input portion 7.

(7) The inputted coordinate data is transmitted by the terminal 6.

(8) Receiving the coordinate data, the host 1 searched the work area 4 for graphic data having coordinates near the coordinates, and develops the retrieved graphic data in the edit area 5 in accordance with the application program 2. In developing the data, the host 1 converts the attribute data to codes specifying display of the line to be edited, such as a specific color code and a specific line type code.

(9) Then, the host 1 transmits the graphic data developed in the edit area 5 to the terminal 6.

(10) Receiving the graphic data, the terminal 6 changes the contents of the predetermined storage unit thereof on the basis of the received graphic data, and displays the graphic pattern on the display portion 8 according to the graphic data. The graphic pattern is displayed, for example, in red or by a broken line according to the attribute. Therefore, the operator can visually distinguish the line to be edited.

(11) The operator manipulates the digitizer used as the input portion 7 to input edit data such as a correction start point, a type of correction (deletion, addition, etc.) and the like.

(12) The terminal 6 transmits the edit data to the host 1.

(13) Receiving the edit data, the host 1 corrects the line to be edited which is in the edit area 5 on the basis of the edit data in accordance with the application program 2.

(14) Then, the host 1 transmits only the changed record to the terminal 6 as correction display data.

(15) Receiving the correction data, the terminal 6 changes the contents of the predetermined storage unit thereof according to the correction data, and displays the graphic pattern on the display portion 8 on the basis of the changed graphic data.

(16) When the operator inputs edit data again by manipulating the input portion 7, the processing returns to step (11). On the other hand, when the operator determines the graphic data by manipulating the input portion 7, the correction processing of the line to be edited is completed.

In this case, the graphic data of the line to be edited is read from the work area 4, where all the graphic data of the drawing to be edited are stored, and is developed (copied) in the edit area 5. When the host 1 receives the edit data from the terminal 6, it corrects only the graphic data in the edit area 5, and transmits the corrected portion to the terminal as the correction display data. In contrast, the graphic data in the work area 4 remains unchanged. Therefore, it does not occur that the graphic data in the work area 4 is changed, or the graphic data of a line which is not subjected to the edition is transmitted to the terminal 6 as the correction display data.

Thus, the processing time from the input of the edit data to the display of the corrected drawing on the terminal 6 is shortened. Furthermore, the graphic data before the correction can be restored from the work area 4 as needed.

After completing the edition of the entire line to be edited, that is, after completing the correction of the edit data developed in the edit area 5, the corresponding graphic data in the work area 4 is updated by the corrected edit data. The graphic data of the drawing to be edited which is in the work area 4 is further transferred and stored into the common file.

Furthermore, the host 1 changes the attribute data in the graphic data developed in the edit area 5 to the code specifying display of the line to be edited, and transmits the changed graphic data to the terminal 6. The terminal 6 receives the graphic data, and displays the graphic pattern whose attribute is changed on the display portion 8 on the basis of the received graphic data. This makes it possible for the operator to positively and immediately grasp the line to be edited among many lines on the display screen.

Figure 3:
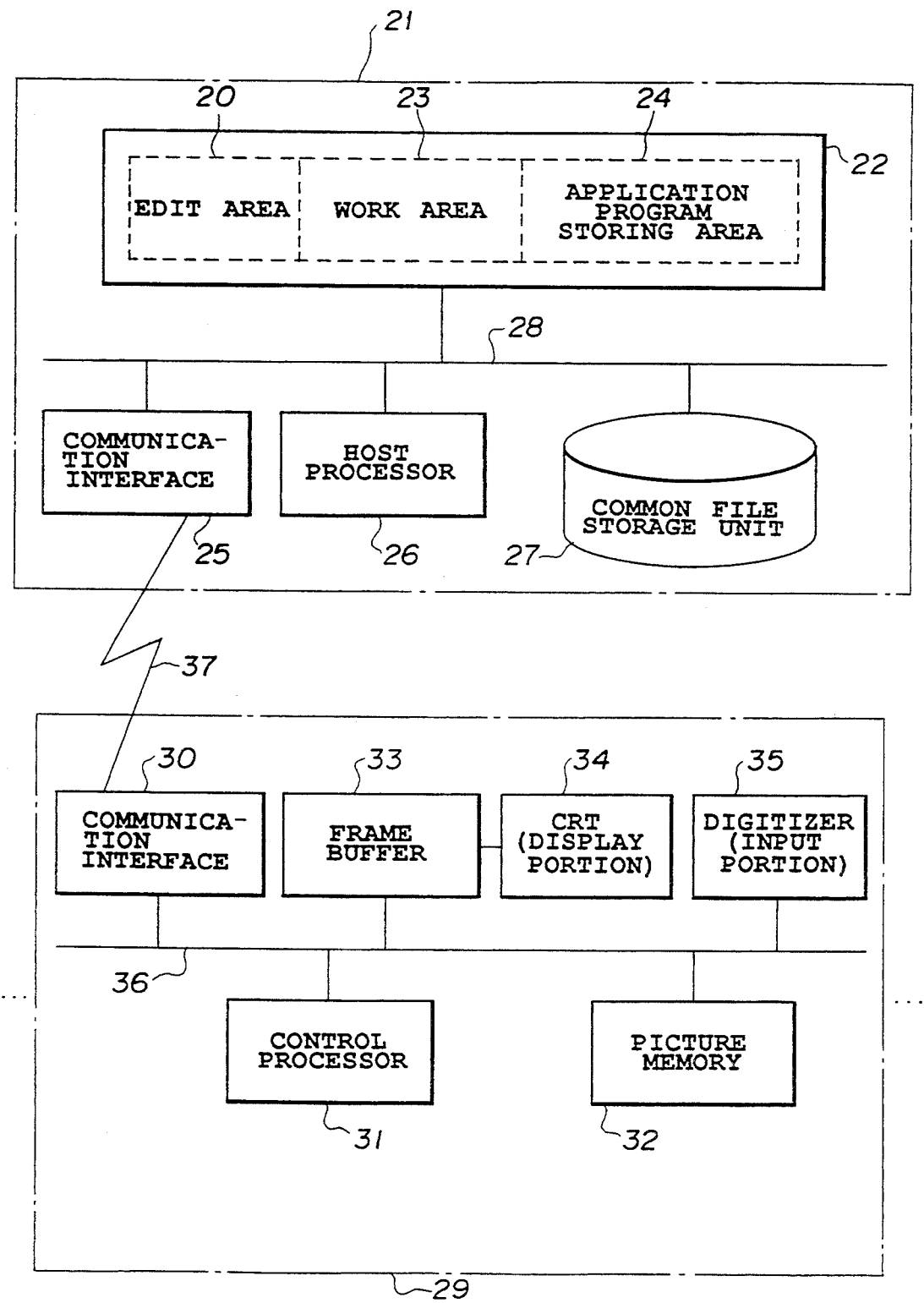
FIG. 3 is a block diagram showing an embodiment of a graphic editing system according to the present invention.
Figure 18:
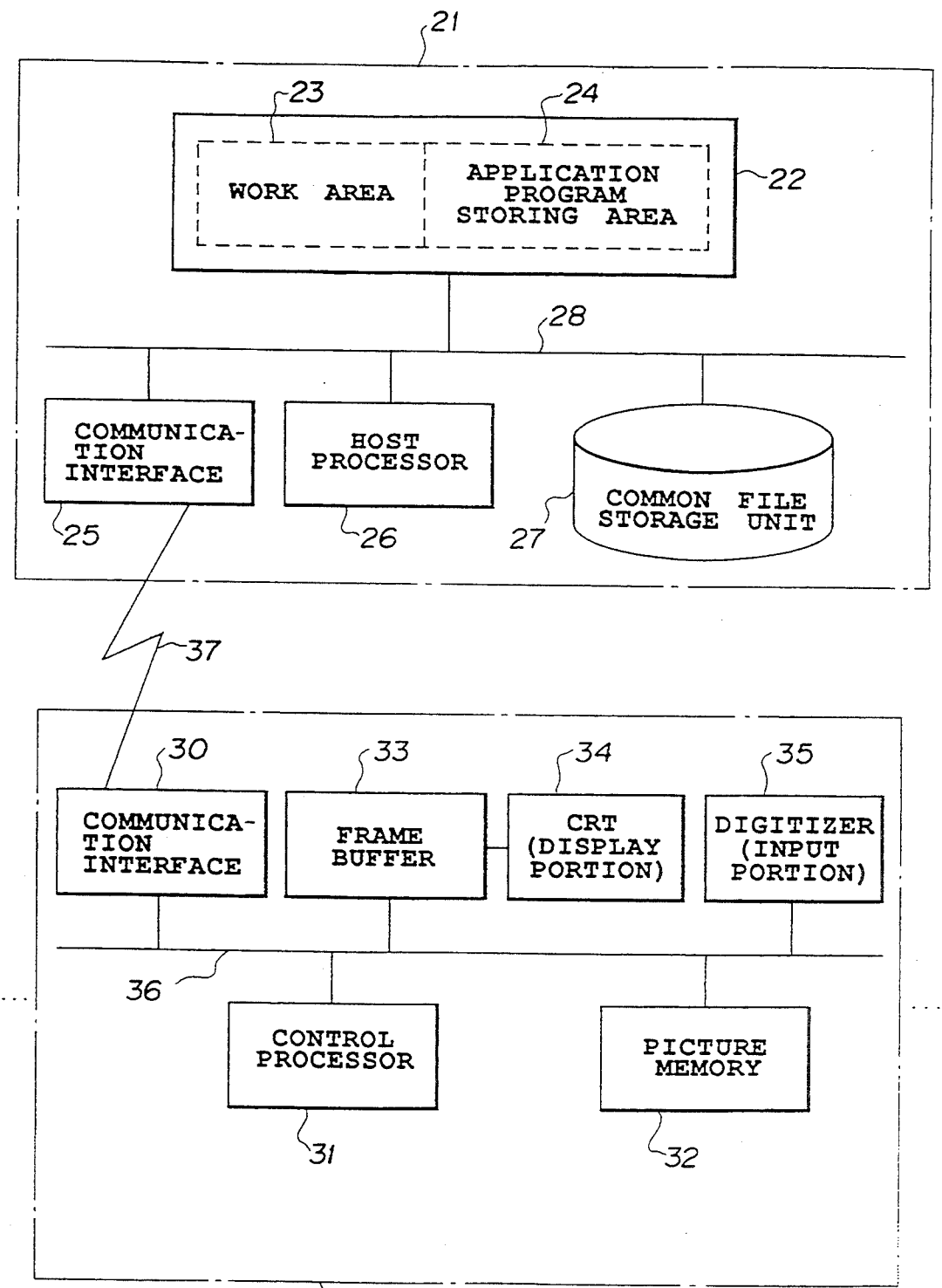
FIG. 18 is a block diagram showing a conventional computer mapping system.
Figure 19:
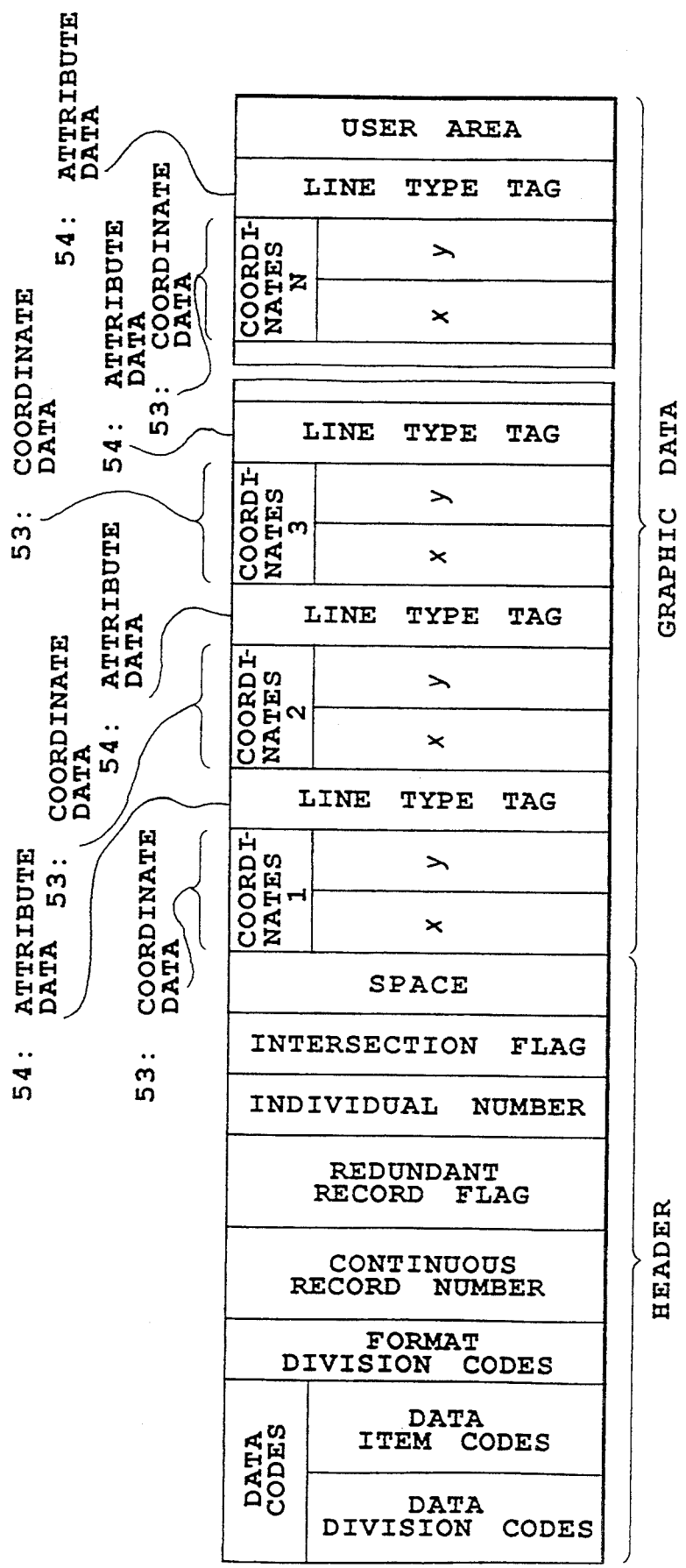
FIG. 19 is a schematic diagram illustrating an example of the format of graphic data.
Figure 20:
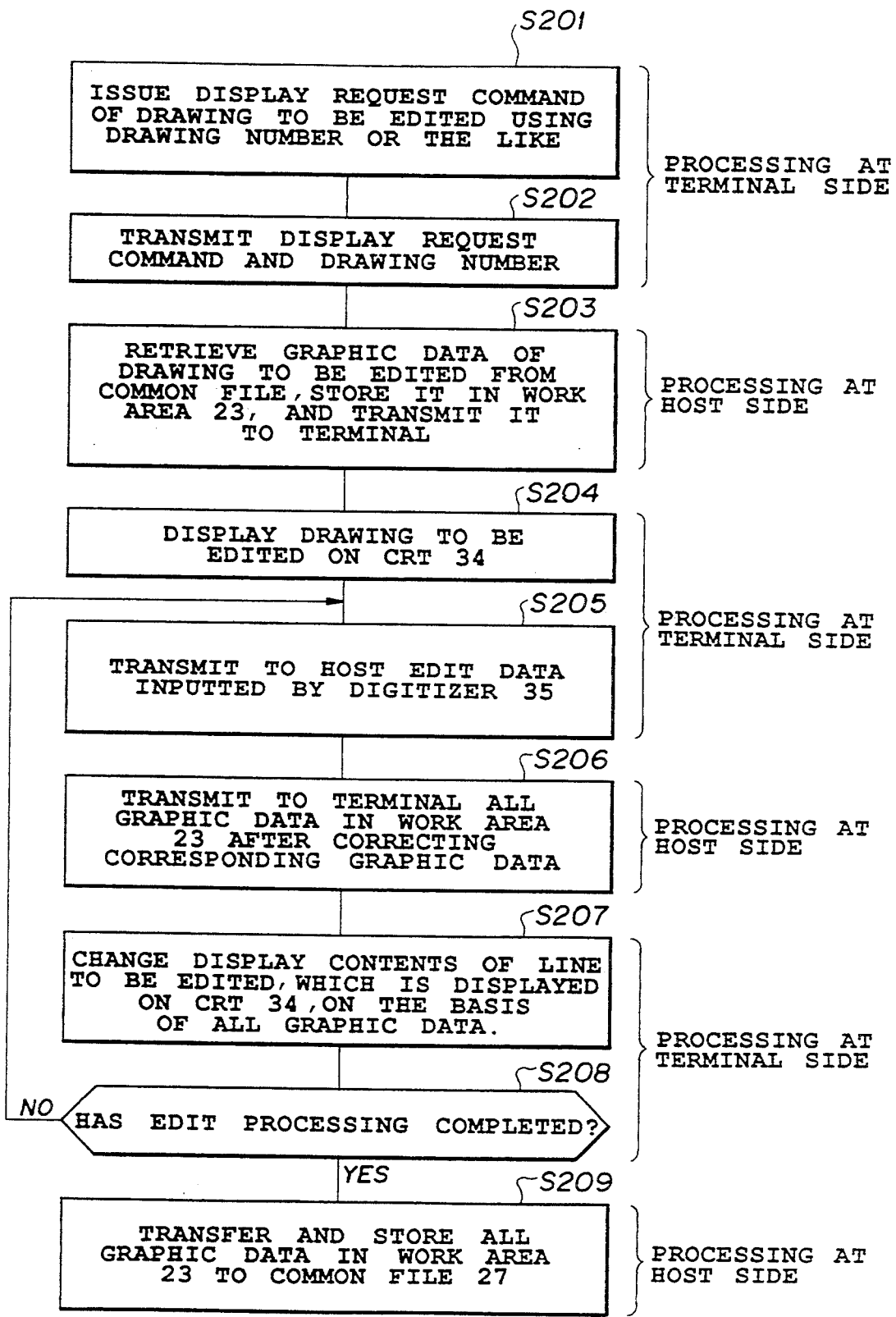
FIG. 20 is a flowchart showing an example of an application program stored in an application program storing area shown in FIG. 18.

FIG. 3 shows the structure of the embodiment according to the present invention. In FIG. 3, like portions are designated by the same reference numerals as in FIG. 18.

The present embodiment differs from the conventional system in the following two points. A first difference is in the structure of the memory 22. Although the conventional system comprises the application program storing area 24 and the work area 23 in the memory 22, the present embodiment comprises an edit area 20 in addition to the application program storing area 24 and the work area 23. A second difference is in the application program stored in the application program storing area 24. More specifically, the application program of the present embodiment comprises:

program code means for retrieving, in response to a request to display a drawing to be edited made by the terminal 29, graphic data of the drawing to be edited from the common file storage unit 27, and for transmitting the graphic data to the terminal 29;

program code means for loading the graphic data of the drawing to be edited, retrieved from the common file storage unit 27, on a work area 23 in the host 21;

program code means for searching, in response to a request for identifying a line to be edited in the drawing to be edited made from the terminal 29 to the host 21, the work area 23 for the line to be edited, and for developing a result of the search in the edit area 20 in the host 21; and program code means for editing the line to be edited in the edit area 20 in response to an edit request made from the terminal 29 to the host 21, and for transmitting a result of the edition to the terminal 29.

Here, the computer program product may be one which is stored in the form of an application program in a storage medium readable by the host 21. Media readable by the host include a magnetic storage medium, an optomagnetic storage medium, and the like.

Figure 4:
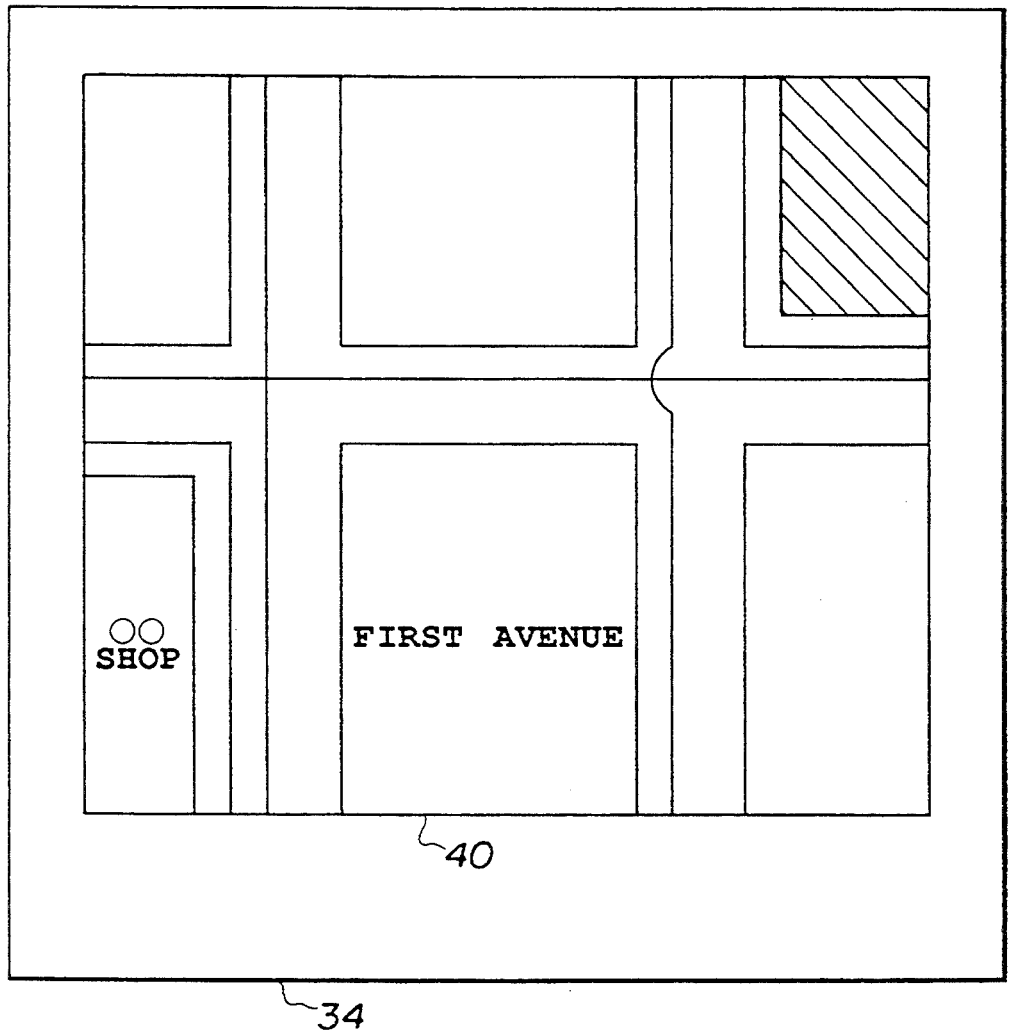
FIG. 4 is a schematic diagram illustrating an example of a drawing to be edited which is displayed on the CRT 34 shown in FIG. 3 before correction.

The CRT 34 of the present embodiment is able to display a drawing 40 to be edited at a time as shown in FIG. 4. During edition, the drawing to be edited is set at the position shown in FIG. 5 on the digitizer 35 of the present embodiment. The digitizer 35 is provided with a command menu 42 at the position shown in FIG. 5 for inputting commands of "deletion" "addition" "line retrieval" "point retrieval" "graphic data determination", and "work area correction".

Figure 5:
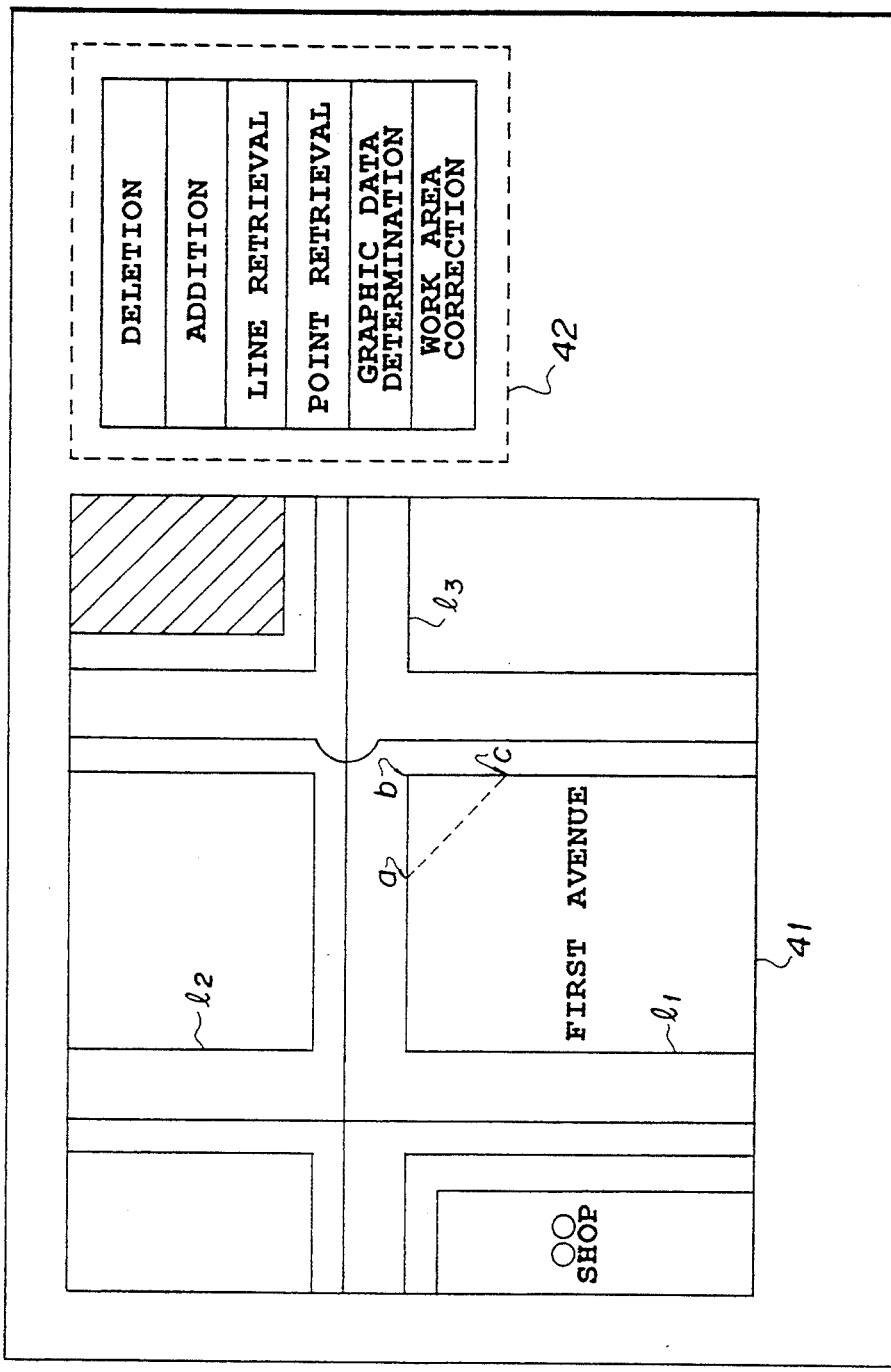
FIG. 5 is a schematic diagram showing the state of a sheet of the drawing to be edited which is set on a digitizer.
Figure 6:
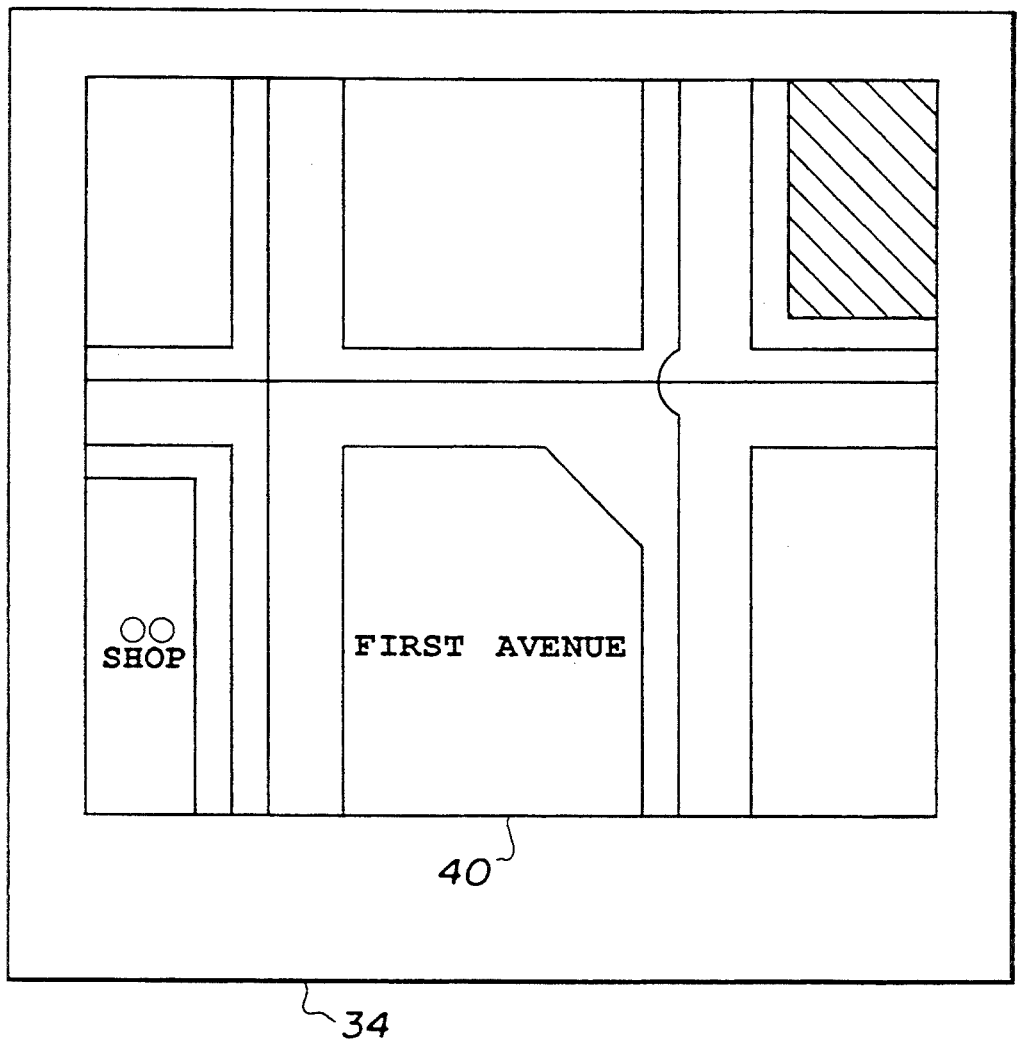
FIG. 6 is a schematic diagram showing the drawing to be edited which is displayed on the CRT after correction.

For example, in order to delete line segments ab and bc on the drawing 41 to be edited as shown in FIG. 5, and then to add a line segment ac, the operator first operates the digitizer 35 to select "deletion" of the command menu 42, and then inputs inflection points a, b, and c of the line segments ab and bc as correction start points. Subsequently, the operator selects "addition" in the command menu 42, and then inputs the inflection points a and c as the correction start points. In this case, the line to be edited is only a line $l_1$ including the inflection points a, b, and c, and all the other lines $l_2$, $l_3$, ... are out of edition. In this case, the display screen of the CRT 34 becomes as shown in FIG. 6, finally. The operator can confirm from the screen that the specified edit processing has been completed.

Next, the application program of the present embodiment stored in the application program storing area 24 will be described.

Figure 7:
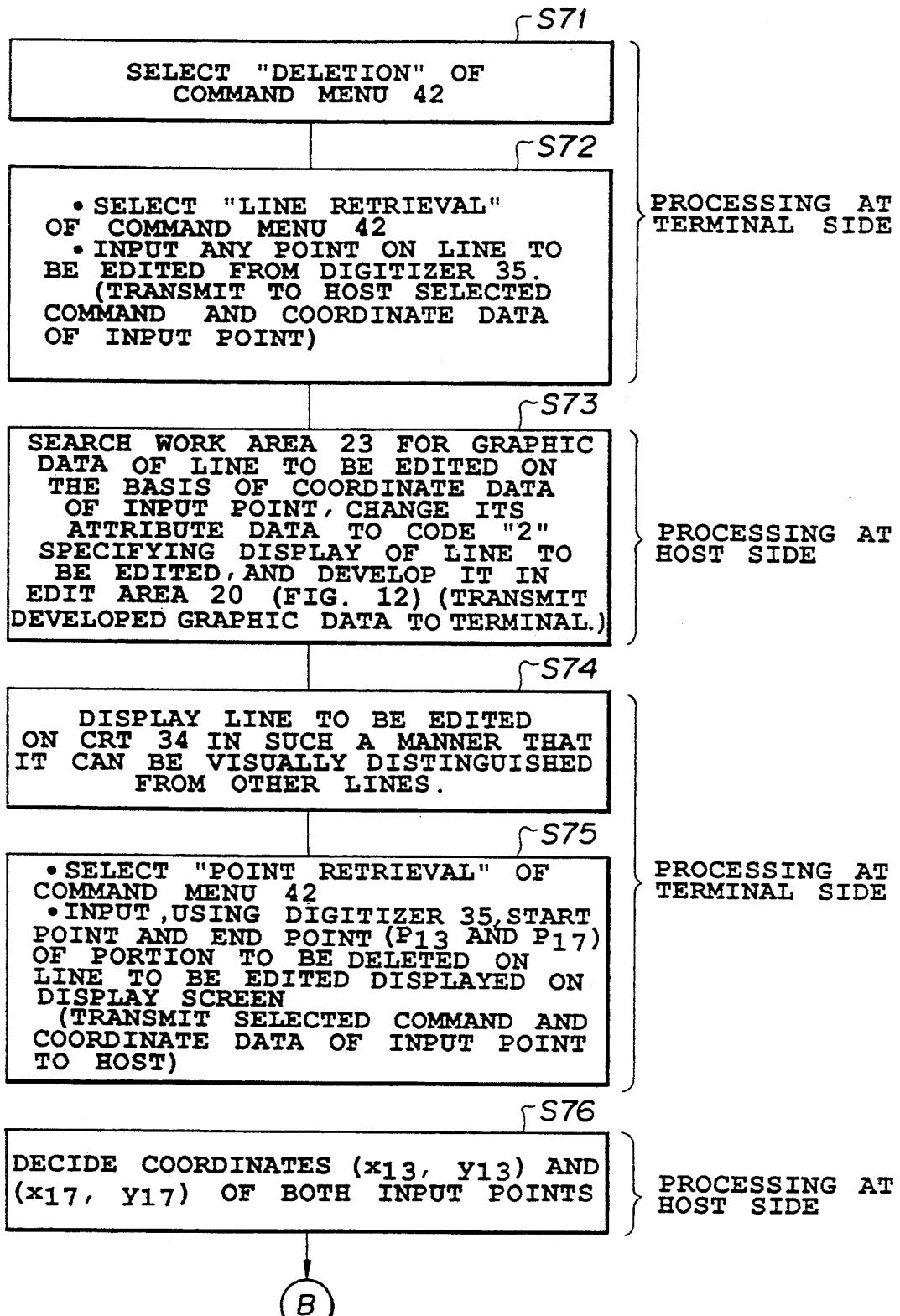
FIG. 7 is a flowchart (1) illustrating an example of a line deletion application program stored in an application program storing area 24.
Figure 8:
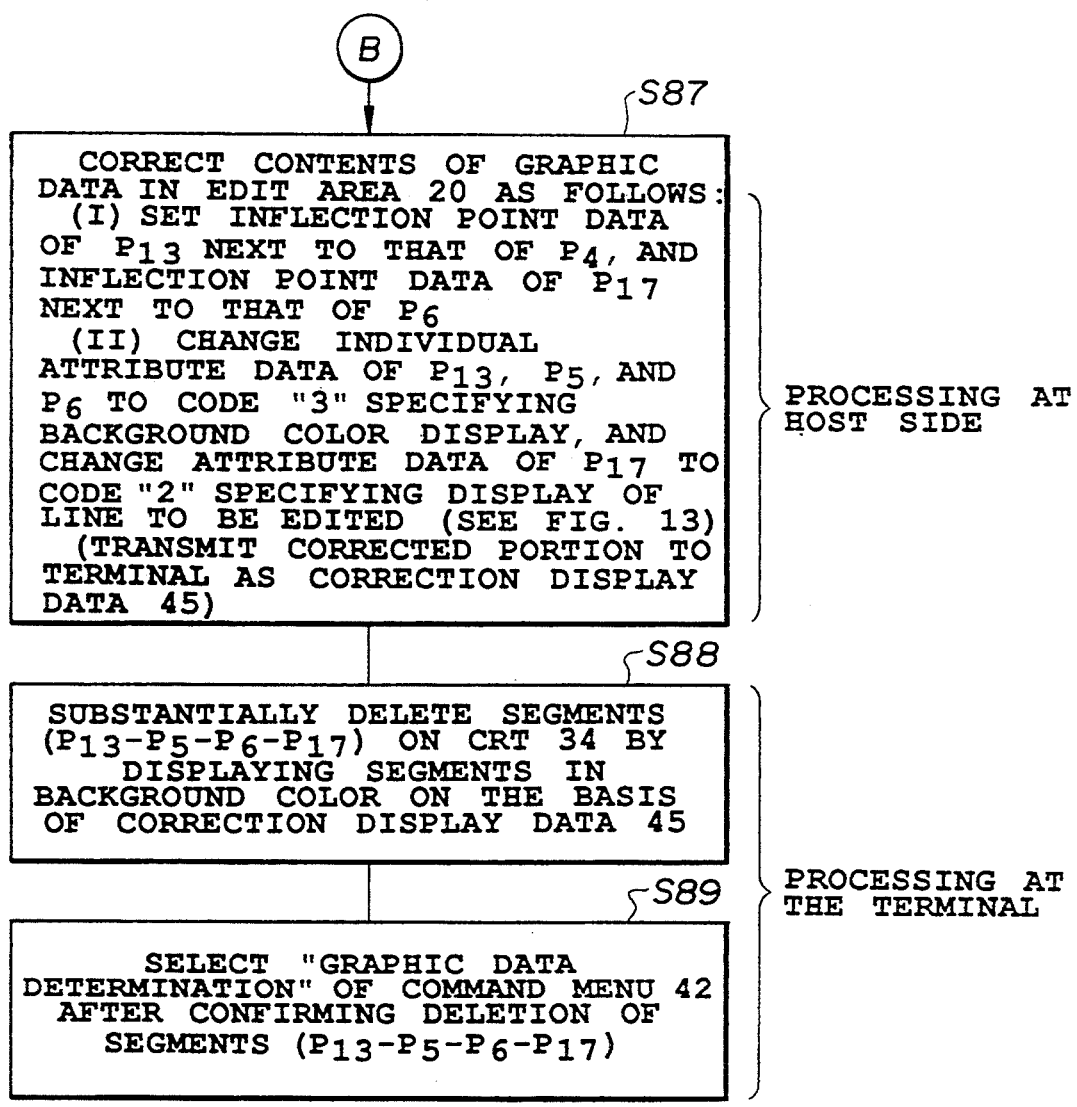
FIG. 8 is a flowchart (2) showing the example of the line deletion application program stored in the application program storing area 24.

FIGS. 7 and 8 are flowcharts showing an example of a line deletion procedure in the graphic editing system according to the present embodiment.

Let us suppose that the drawing to be edited is set on the digitizer 35, a specified drawing to be edited is retrieved from the common file storage unit 27 and is stored in the work area 23, and the specified drawing to be edited is displayed on the CRT 34.

With this condition, a line to be edited is retrieved, first. Specifically, in step S71, the operator manipulates the digitizer 35 to select "deletion" in the command menu 42. Then, in step S72, the operator manipulates the digitizer 35 to select "line retrieval" in the command menu 42, and inputs coordinates of any one point (input point) on the line to be edited. After that, the selected commands and the coordinate data of the input point are transferred by the control processor 31 to the communication interface 30 through the image bus 36, and then transmitted by the communication interface 30 to the host 21 through the communication line 37.

When the selected commands and the coordinate data of the input point are received by the communication interface 25 of the host 21, the host processor 26 searches the work area 23 for graphic data of the line to be edited having coordinates near the coordinate data according to the received coordinate data of the input point. Then, the host processor 26 changes the attribute data of the searched graphic data to code "2" specifying display of the line to be edited (for example, to a red display code), and develops the graphic data in the edit area 20. FIG. 12 shows the contents of the graphic data developed in the edit area 20. In FIG. 12, the attribute data "5" indicates the coordinate data of the final characteristic point. The reason why the host processor 26 searches for a line which includes coordinate data in the immediate vicinity of the received coordinate data is that a position which the operator intends to indicate by using the digitizer 35 may not be exactly the same as a position actually indicated.

Subsequently, the developed graphic data is transferred by the host processor to the communication interface 30 through the host bus 28, and is transmitted by the communication interface 30 to the terminal 29 through the communication line 37.

Figure 11:
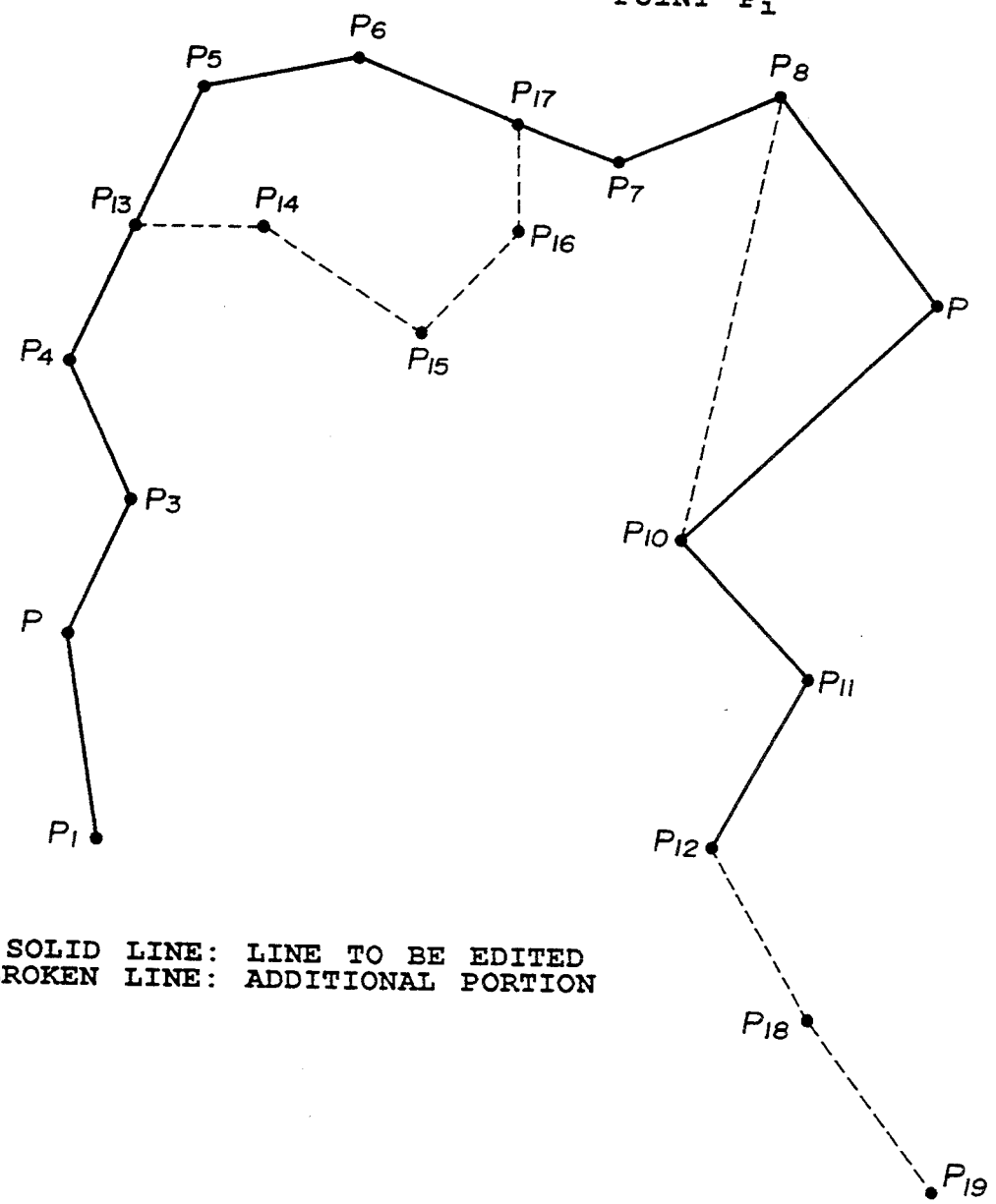
FIG. 11 is a schematic diagram showing an example of a line to be edited for explaining the line deletion and line addition.

When the graphic data is received by the communication interface 30 of the terminal, the control processor 31 adds the received graphic data to the picture memory 32 in step S73. Then, the graphic data stored in the picture memory 32 is overwritten on the frame buffer 33, and the line to be edited is displayed on the CRT 34 according to the graphic data in the frame buffer 33. FIG. 11 shows an example of the line to be edited. In FIG. 11, Pi indicates an i-th characteristic point (inflection point), and its coordinates are represented as $(x_i, y_i)$. Since the displayed line to be edited is shown in red, the line to be edited can be visually distinguished from the other lines.

For example, when a line "$P_{13}$-$P_5$-$P_6$-$P_{17}$" with end points $P_{13}$ on a line "$P_4$-$P_5$" and $P_{17}$ on a line "$P_6$-$P_7$" is to be deleted from the line "$P_1$-$P_2$- . . . $P_{11}$-$P_{12}$" to be edited which is displayed in red, the flow of the application program is as follows.

In step S75, the operator selects "point retrieval" in the command menu 42 by manipulating the digitizer 35. Then, watching the line to be edited which is displayed in red on the CRT 34, the operator, by manipulating the digitizer 35, inputs the start point and end point on the line which is among the lines on the drawing to be edited set on the digitizer 35, and corresponds to the line displayed in red. The start point and end point correspond to points $P_{13}$ and $P_{17}$ of the portion to be deleted. Then, the selected command and coordinate data of the input points are transferred by the control processor 31 to the communication interface 30 through the image bus 36, and are transmitted by the communication interface 30 to the host 21 through the communication line 37.

In step S76, the communication interface 25 of the host 21 receives the selected command and coordinate data of the input points, and the host processor determines the correct coordinates of the start point and the end point using coordinate data of the input points and the graphic data of the line to be edited which have been developed in the edit area 20, This is performed because the positions which the operator intends to indicate by using the digitizer 35 are not exact positions which are actually indicated. Subsequently, the line segments are determined which are associated with the shortest among the perpendiculars dropped from the individual input points to the individual line segments on the line to be edited. In this case, line segments "$P_4$-$P_5$" and "$P_6$-$P_7$" are individually determined. Then, the coordinates of the intersection points of these specified line segments and the perpendiculars to these lines are calculated. In this case, the coordinates $(x_{13}, y_{13})$ and the coordinates $(x_{17}, y_{17})$ are individually calculated.

Figure 13:
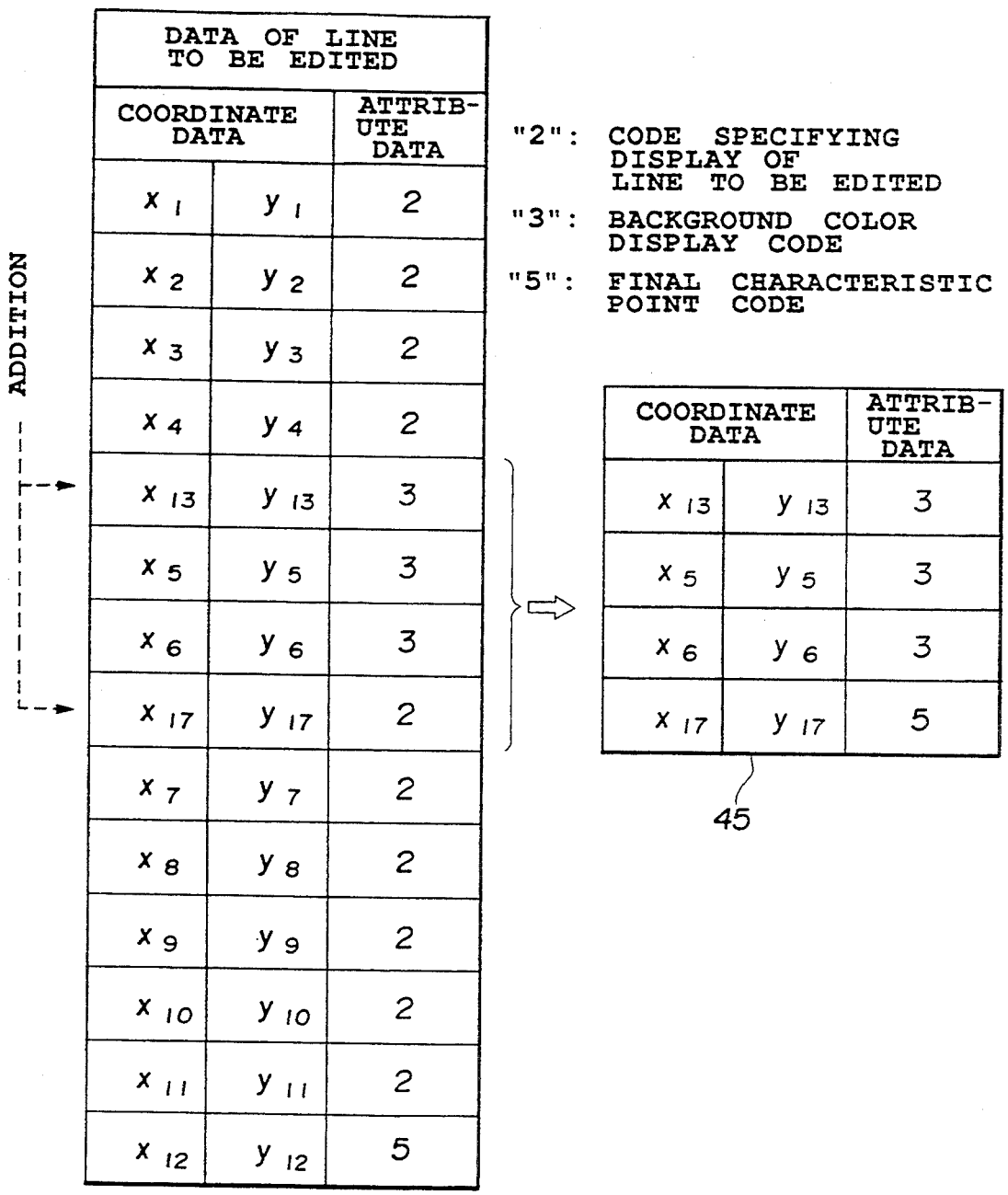
FIG. 13 is a schematic diagram showing the contents of the graphic data when deleting line segments "$P_{13}$-$P_5$-$P_6$-$P_{17}$" of the line to be edited.

In the next step S87, inflection point data $P_{13}$ is set next to the inflection point data $P_4$ in the edit area 20, and then inflection point data $P_{17}$ is set next to the inflection point data $P_6$. Furthermore, the attribute data of $P_{13}$, $P_5$, and $P_6$ are changed to codes "3" specifying display in a background color (e.g. green), and attribute data of $P_{17}$ is changed to code "2" specifying display of the line to be edited. FIG. 13 shows the contents of the resultant graphic data. After that, attribute data of $P_{17}$ of the corrected portion is changed to the final characteristic point code "5". Subsequently, data 45 for deletion display (for correction display) associated with only the corrected part as shown in FIG. 13 is prepared, is transferred by the host processor to the communication interface 25 through the host bus 28, and is transmitted by the communication interface 25 to the terminal 29 through the communication line 37. Alternatively, corrected graphic data, that is, one record after correction may be transmitted to the terminal 29. In this case, the picture memory 32 is used additionally.

In step S88, the data 45 for deletion display is received through the communication interface 30 of the terminal 29. The received deletion display data 45 is added to the picture memory 32. The deletion display data 45 in the picture memory 32 is transferred to the frame buffer 33 through the image bus 36, and a graphic pattern is displayed on the CRT 34 according to the deletion display data 45. In this case, since the line "$P_{13}$-$P_5$-$P_6$-$P_{17}$" is displayed in the same color as the background color, the line "$P_{13}$-$P_5$-$P_6$-$P_{17}$" appears to be deleted from the line to be edited.

When the operator selects "graphic data determination" in the command menu 42 by manipulating the digitizer 35, the command menu is transferred by the control processor 31 to the communication interface 30 through the image bus 28, and is transmitted by the communication interface 30 to the host 21 through the communication line 37.

When the communication interface 25 of the host 21 receives the "graphic data determination" command, the correction processing of the line to be edited is ended by the host processor.

In previous step S73, when the graphic data of the line to be edited is searched for in the work area 23, determination is made as to whether or not the input point is present on each line segment specified by the graphic data of the work area 23. As a result, if there is a line passing the input point, that graphic data is selected. On the other hand, if there is no line passing the input point, the graphic data of a line, to which the shortest perpendicular is dropped from the input point, is selected.

Although already described, the reason why graphic data of the line is selected, to which the shortest perpendicular is dropped from the point inputted by the operator manipulating the digitizer 35, is that the digitizer 35 has low accuracy in reading the input point, and hence the coordinate data of a point on the line to be edited may sometimes not be inputted correctly.

Furthermore, when the start point and end point of the delete part coincide with characteristic points as when a line "$P_8$-$P_9$-$P_{10}$" shown in FIG. 11 is deleted, processing to determine an intersection point with a perpendicular may be skipped, after confirming in step S76 that the coordinate data of the start point and end point have been already developed in the edit area 20 as the coordinate data of the line to be edited, and this coordinate data may be used in next step.

Figure 9:
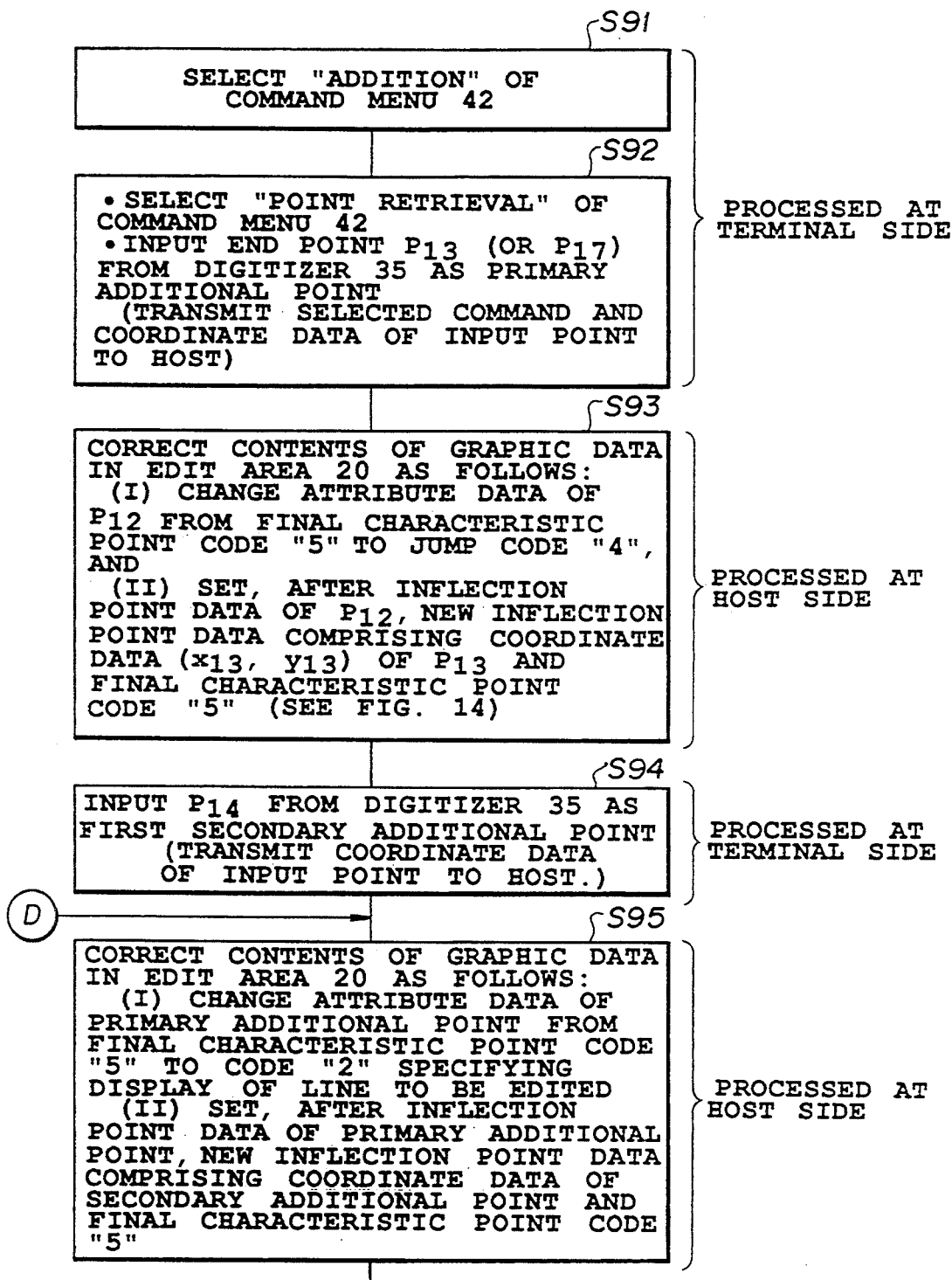
FIG. 9 is a flowchart (1) showing an example of a line addition application program stored in the application program storing area 24.
Figure 10:
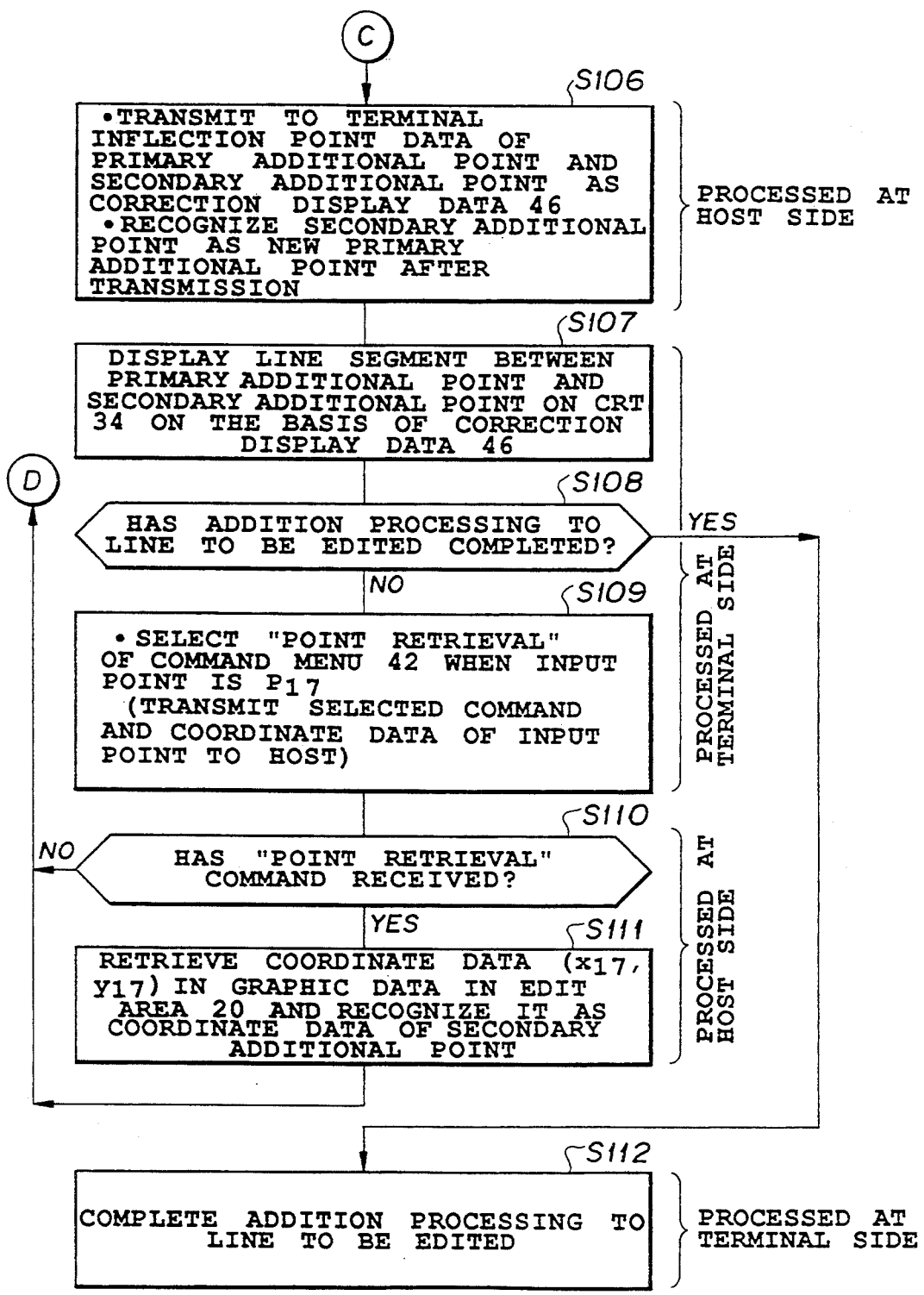
FIG. 10 is a flowchart (2) showing the example of the line addition application program stored in the application program storing area 24.

FIGS. 9 and 10 show flowcharts of an example of a line addition processing procedure in the graphic editing system according to the present embodiment. This is an example for adding a line "$P_{13}$-$P_{14}$-$P_{15}$-$P_{16}$-$P_{17}$".

In step S91, the operator selects "addition" of the command menu 42 by manipulating the digitizer 35. Likewise, the operator selects "point retrieval" of the command menu 42 in step S92. Subsequently, the operator inputs the end point like the point $P_{13}$ of a portion deleted on the display screen of the CRT 34 by manipulating the digitizer 35 as a primary additional point. Then, the selected command and the coordinate data of the input point are transferred by the control processor 31 to the communication interface 30 of the terminal 29, and is transmitted by the communication interface 30 to the host 21 through the communication line 37.

In step S93, when the communication interface 25 of the host 21 receives the commands and the coordinate data of the input point, the host processor corrects the graphic data in the edit area 20 on the basis of the commands and the input point data which have been received. Specifically, the attribute data of the point $P_{13}$ is changed from the final characteristic point code "5" to the jump code "4". In addition, the coordinate data ($x_{13}$, $y_{13}$) retrieved from the graphic data on the basis of the received input point data (coordinate data), and the final characteristic point code "5" are set next to the point $P_{12}$ as new inflection point data. FIG. 14 shows the contents of the graphic data when the end point $P_{13}$ is processed as the primary additional point. In this case, the jump code "4" indicates that a jump from that point to the next point occurs, that is, that no line is present between the two points.

In step S94, the operator inputs a point $P_{14}$ as a secondary additional point by manipulating the digitizer 35. Then, the coordinate data of the input point is transferred by the control processor 31 to the communication interface 30 of the terminal 29, and is transmitted by the communication interface 30 to the host 21 through the communication line 37.

When the communication interface 25 of the host 21 receives the coordinate data of the input point in step S95, the host processor corrects the graphic data in the edit area 20. Specifically, the host processor changes the attribute data of the primary additional point from the final characteristic point code "5" to the code "2" indicating the display of the line to be edited. Subsequently, it sets new inflection point data including the coordinates of the secondary additional point and the final characteristic point code "5" next to the inflection point data of the primary additional point. FIG. 15 shows the corrected graphic data with regard to the secondary additional point $P_{14}$.

Then, the host processor retrieves the inflection point data of the primary additional point and the secondary additional point of the graphic data in the edit area 20 in order to prepare additional display (correction display) data 46. The prepared additional display data is transferred to the communication interface 25, and is transmitted by the communication interface 25 to the terminal 29 through the communication line 37. After the transmission, the secondary additional point is recognized as a new primary additional point.

In step S107, when the communication interface 30 of the terminal 29 receives the addition display data, the control processor 31 writes the addition display data 46 into the picture memory 32. Then, the control processor 31 loads the graphic data in the picture memory 32 on the frame buffer 33, and displays a figure on the CRT 34 on the basis of the graphic data in the frame buffer 33.

The portion between the primary additional point and the secondary additional point in the displayed figure is represented by a color indicating the portion to be edited.

In step S108, if the operator further inputs "graphic data determination" of the command menu 42 by manipulating the digitizer 35, the processing transfers to step S112, where addition processing to the line to be edited is completed.

On the other hand, when the operator inputs a next secondary additional point in step S108 by manipulating the digitizer 35, that is, when addition processing to the line to be edited is not completed, the processing transfers to step S109.

When the secondary additional point is the point $P_{17}$, the operator should also select "point retrieval" of the command menu 42 in step S109. Thus, the coordinate data and the selected command are transferred by the control processor 31 to the communication interface 30, and is transmitted by the communication interface 30 to the host 21 through the communication line 37.

In step S110, when the communication interface 25 of the host 21 receives the "point retrieval" command, the processing transfers to step S111, whereas when it does not receive the "point retrieval" command, the processing transfers to step S95.

In step S111, the coordinate data $(x_{17}, y_{17})$ is retrieved from graphic data in the edit area 20 on the basis of the received secondary additional point $P_{17}$. The coordinate data is recognized as new coordinate data of the secondary additional point, and the processing returns to step S95. FIG. 16 shows the graphic data in the edit area 20 at the time the addition processing has been completed.

When the broken line segment $[P_8-P_{10}]$ is added after the segments $[P_8-P_9-P_{10}]$ of the line to be edited have been deleted, the following procedures are carried out in step S91 to step S112 shown in FIGS. 9 and 10.

For example, $P_8$ is used as a primary additional point in place of the point $P_{12}$ in step S92, and the coordinate data $(x_8, y_8)$ is retrieved in place of the coordinate data $(x_{13}, y_{13})$ in step S93, and the processing transfers to step S109. In step S109, $P_{10}$ is inputted as a secondary additional point, and "point retrieval" of the command menu 42 is selected. In step S111, the coordinate data $(x_{10}, y_{10})$ is retrieved in place of $(x_{17}, y_{17})$. Then, the processing moves from step S93 to step S109, skipping step S94.

Furthermore, when segments $[P_{12}-P_{18}-P_{19}]$ is added to the end point $P_{12}$ of the line to be edited, for example, the change in the attribute data of $P_{12}$ from "5" to "4" in step S92 may be omitted. FIG. 17 shows the graphic data when the addition processing has been completed.

After such deletion and addition processings to the line to be edited have been completed, corrected graphic data whose contents are decided by the "graphic data determination" command is formed. Then, the data associated with a deletion flag record is deleted from the corrected graphic data, and the data adjacent thereto are connected by a jump code. In addition, the individual attribute data are changed from "2" to "1". When the record in the work area 23 is updated based on the data in the edit area 20, that is, when the graphic data of the line to be edited before correction is updated, the "work area correction" command of the command menu 42 is used.

Furthermore, when the graphic pattern before correction is required in the course of correction, the operator manipulates the digitizer to select the "deletion" or "addition" commands, and then inputs the coordinates of an input point. This changes all the attribute "2" of the data in the record in the edit area to "3" of the deletion flag, and the data is transmitted to the display portion. In addition, the record in the work area, which is associated with the record number, is again loaded on the edit area, and is displayed. Thus, the graphic data in the work area is loaded on the edit area, and a figure is displayed on the basis of that graphic data. Therefore, the graphic data is restored in the edit area merely by the operation of the computer.

In the present embodiment, only the graphic data of a line to be edited is selected from the work area storing all the graphic data of a drawing to be edited, and is developed in the edit area. Further, only the graphic data in the edit area is changed (deleted, added) in accordance with the edit data from a terminal, and only the changed graphic data is transmitted to the terminal. The terminal corrects the graphic data which has been stored in the terminal by adding the incoming graphic data, overwrites the corrected graphic data, and displays a figure according to the overwritten graphic data. Accordingly, the processing time from the transmission of the edit data to the host by the operator to the display of the corrected drawing at the terminal can be shortened.

Furthermore, in the present embodiment, since the line to be edited can be distinguished from other lines by coloring, for example, and the deleted portion of the line to be edited is displayed in the background color, correction of the line to be edited can be efficiently carried out.

We claim:

1. A graphic editing method for editing line graphic data of a predetermined format stored in storage means of a host computer, by using a terminal capable of communicating with the host computer, said graphic editing method comprising:

a first step for retrieving, in response to a request for displaying a drawing to be edited made from said terminal to said host computer, graphic data of the drawing to be edited from said storage means of said host computer, and for loading the graphic data on a work area in said host computer;

a second step for loading the graphic data of the drawing to be edited in said work area to storage means of said terminal;

a third step for displaying the drawing to be edited on display means of said terminal on the basis of the graphic data of the drawing to be edited loaded on said storage means of said terminal;

a fourth step for searching, in response to a request for identifying a line to be edited in the drawing to be edited made from said terminal to said host computer, said work area for the line to be edited, and for developing a result of the search in an edit area in said host computer;

a fifth step for editing the line to be edited in said edit area in said host computer in response to an edit request made from said terminal to said host computer;

a sixth step for loading data of the line to be edited, which has been edited in said edit area in said host computer, on said storage means of said terminal; and a seventh step for displaying a drawing on said display means of said terminal on the basis of data stored in said storage means of said terminal.

2. The graphic editing method as claimed in claim 1, wherein said fourth step changes attribute data developed in said edit area to a code specifying the line to be edited in order to visually distinguish the line, said sixth step transmits to said terminal graphic data whose attribute data is changed to the code specifying the line to be edited, and said seventh step displays the drawing on said display means on the basis of the changed graphic data received.

3. The graphic editing method as claimed in claim 1 or claim 2, wherein said fourth step, when a correction start point on the line to be edited corresponds to coordinate data of a point on the graphic data developed in said edit area, uses said coordinate data, or when said correction start point does not correspond to any of said coordinate data, adds a point, which corresponds to said correction start point on the line between characteristic points in art immediate vicinity of said correction start point, to the graphic data as a new characteristic point.

4. The graphic editing method as claimed in claim 3, wherein said fifth step, when content of edit data is "deletion of a line segment between correction start points on a line to be edited", changes attribute data between characteristic points corresponding to the correction start points of the graphic data developed in said edit area to a background color code of said display means, and subsequently transmits to said terminal the graphic data at least between the characteristic points as correction display data, and said seventh step displays the line to be edited between the characteristic points in the same color as the background color on the basis of the received correction data.

5. The graphic editing method as claimed in claim 3, wherein said fifth step, when content of edit data is "a start point between correction start points" and said correction start point does not correspond to a point on the line to be edited, takes said correction start point into the graphic data developed in said edit area as a new characteristic point.

6. The graphic editing method as claimed in claim 3, wherein said fifth step, when content of edit data is "addition between said correction start points", sequentially arranges coordinate data of said characteristic points corresponding to said correction start points, changes attribute data of a primary additional characteristic point into a code specifying display of the line to be edited, and transmits content of the graphic data developed in said edit area to said terminal as correction display data that visually distinguishes at least the graphic data between said characteristic points; and said seventh step displays on said display means a line segment between said characteristic points as said line to be edited on the basis of said correction display data.

7. The graphic editing method of claim 1, wherein said request for identifying a line to be edited is carried out by designating a single point on the line to be edited.

8. The graphic editing method as claimed in claim 5, wherein said fifth step, when content of edit data is "addition between said correction start points", sequentially arranges coordinate data of said characteristic points corresponding to said correction start points, changes attribute data of a primary additional characteristic point into a code specifying display of the line to be edited, and transmits content of the graphic data developed in said edit area to said terminal as correction display data that visually distinguishes at least the graphic data between said characteristic points; and
said seventh step displays on said display means a line segment between said characteristic points as said line to be edited on the basis of said correction display data.

9. A graphic editing system including a host computer having storage means for storing line graphic data of a predetermined format, and a terminal capable of communicating with said host computer,
said host computer comprising:
data retrieving means for retrieving, in response to a request for displaying a drawing to be edited made from said terminal to said host computer, graphic data of the drawing to be edited from said storage means;
first load means for loading on a work area the graphic data of the drawing to be edited, which has been retrieved by the data retrieving means;
search means for searching, in response to a request for identifying a line to be edited in the drawing to be edited made from said terminal to said host computer, said work area for the line to be edited;
an edit area for developing a result of the search by said search means; and
edit means for editing the line to be edited in said edit area in response to an edit request made from said terminal to said host computer; and
said terminal comprising:
second load means for loading the graphic data of the drawing to be edited, which has been retrieved by said data retrieving means, on storage means of said terminal, and for loading line data to be edited, which has been edited in said edit area, on said storage means of said terminal; and
display means for displaying a drawing to be edited on the basis of the graphic data of the drawing to be edited, which is loaded by said second load means, and for displaying a drawing after edition on the basis of the graphic data after edition which are stored in said storage means of said terminal.

10. The graphic editing system of claim 9, wherein said request for identifying a line to be edited is carried out by designating a single point on the line to be edited.

* * * * *